United States Patent
Weldon

(10) Patent No.: US 10,334,060 B1
(45) Date of Patent: Jun. 25, 2019

(54) SYSTEM FOR DETERMINING A TIME ZONE DIFFERENCE BETWEEN A USER'S COMPUTER AND AN ISP SERVER

(71) Applicant: United Services Automobile Association (USAA), San Antonio, TX (US)

(72) Inventor: Duane E. Weldon, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 728 days.

(21) Appl. No.: 14/947,440

(22) Filed: Nov. 20, 2015

(51) Int. Cl.
*G06Q 20/38* (2012.01)
*G06Q 20/40* (2012.01)
*G06Q 30/00* (2012.01)
*H04L 29/06* (2006.01)
*H04L 29/08* (2006.01)
*H04W 12/12* (2009.01)

(52) U.S. Cl.
CPC ............ *H04L 67/18* (2013.01); *H04L 67/02* (2013.01); *G06Q 20/382* (2013.01); *G06Q 20/4016* (2013.01); *G06Q 30/00* (2013.01); *H04L 63/1441* (2013.01); *H04L 63/1483* (2013.01); *H04L 2463/102* (2013.01); *H04W 12/12* (2013.01)

(58) Field of Classification Search
CPC .. G06Q 20/382; G06Q 20/4016; G06Q 30/00; H04L 2463/102; H04L 63/1483; H04L 63/1441; H04W 12/12
See application file for complete search history.

(56) References Cited

U.S. PATENT DOCUMENTS

| | | | | |
|---|---|---|---|---|
| 7,853,533 | B2 * | 12/2010 | Eisen ................. | G06Q 20/3674 368/89 |
| 8,204,833 | B2 * | 6/2012 | Mu ..................... | G06Q 20/3821 705/76 |
| 8,793,758 | B2 * | 7/2014 | Raleigh ................. | G06F 21/57 726/1 |
| 2007/0234061 | A1 * | 10/2007 | Teo ........................ | G06F 21/566 713/178 |
| 2009/0037213 | A1 * | 2/2009 | Eisen ....................... | G06F 21/73 705/318 |
| 2011/0082768 | A1 * | 4/2011 | Eisen .................. | G06Q 30/0609 705/26.35 |
| 2013/0007104 | A1 * | 1/2013 | Iyer ...................... | G04G 9/0076 709/203 |

(Continued)

OTHER PUBLICATIONS

Layton et al. "Time Zones" from maps.unomaha.edu, 3 pages, Dec. 7, 1999 (Year: 1999).*

*Primary Examiner* — David R Lazaro
(74) *Attorney, Agent, or Firm* — Joseph A. Fuchs; Greensfelder, Hemker & Gale, P.C.

(57) ABSTRACT

A system to determine a difference in a time zone of a user's computer accessing the Internet through an Internet Service Provider ("ISP") server and the time zone of the ISP server including capturing from a clock of the user's computer the user's time zone, capturing the location of the ISP server, calculating a difference in the time zone of the user's computer and a time zone of the ISP server to determine a delta time zone number; and reporting the delta time zone number.

14 Claims, 3 Drawing Sheets

(56) References Cited

U.S. PATENT DOCUMENTS

| | | | |
|---|---|---|---|
| 2014/0149552 A1* | 5/2014 | Carney | H04L 67/32 |
| | | | 709/219 |
| 2015/0373304 A1* | 12/2015 | Menand | H04H 60/45 |
| | | | 725/10 |
| 2017/0188232 A1* | 6/2017 | Raleigh | H04W 12/06 |
| 2017/0255995 A1* | 9/2017 | Kay | H04L 43/14 |
| 2018/0020324 A1* | 1/2018 | Beauford | H04W 4/021 |

\* cited by examiner

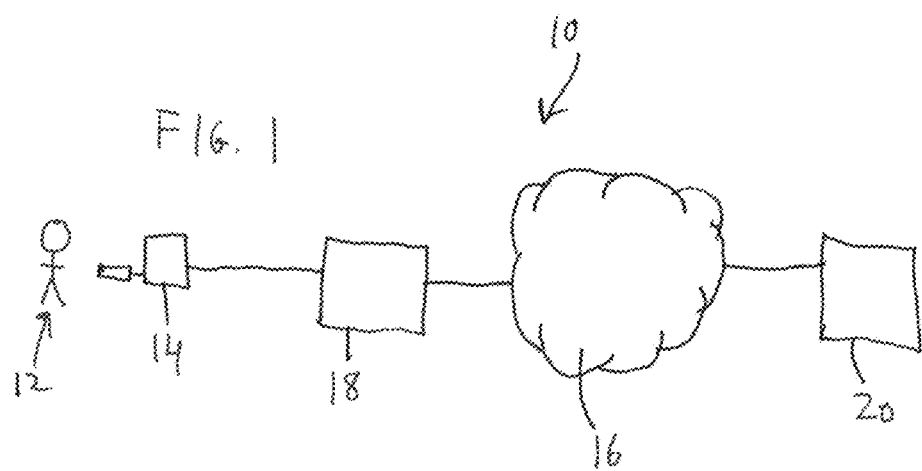

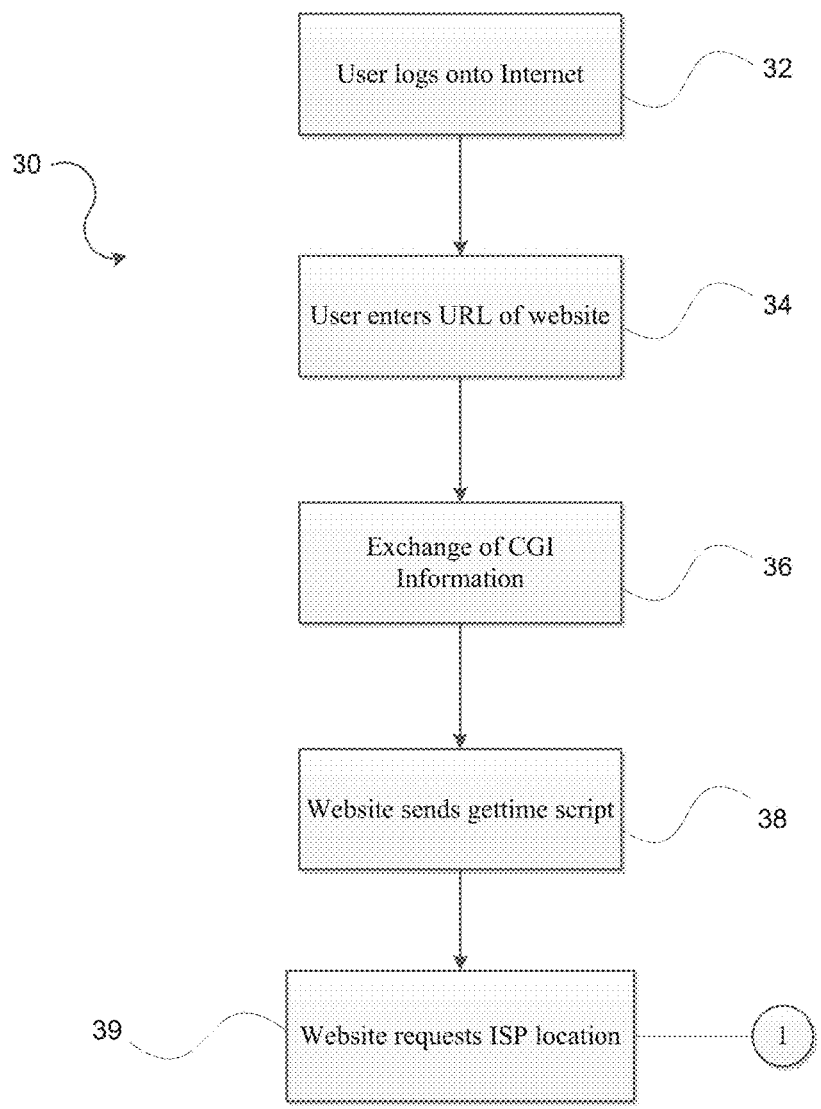

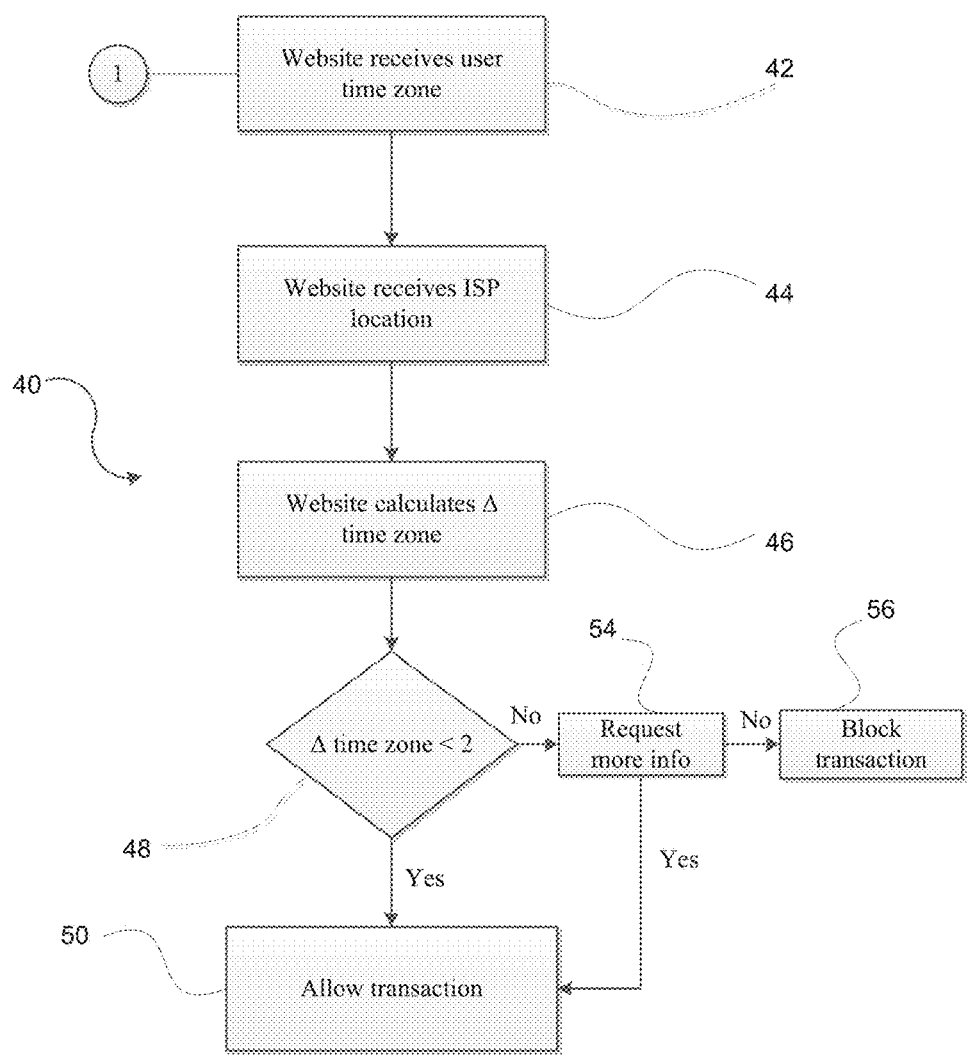

US 10,334,060 B1

SYSTEM FOR DETERMINING A TIME ZONE DIFFERENCE BETWEEN A USER'S COMPUTER AND AN ISP SERVER

FIELD OF THE INVENTION

A system is described for determining a difference in a time zone of a user's computer location and a time zone of an Internet Service Provider server location through which the user accesses the Internet.

BACKGROUND OF THE INVENTION

Commercial websites capture a variety of parameters from a users' computers known as Common Gateway Interface parameters (CGI parameters). The CGI parameters are captured when the website issues a script to the user's computer attempting to logon to the website. The user's computer returns values for the CGI parameters requested. These parameters commonly include non-personal information such as an Internet Protocol (IP) address which is unique to a computer. IP addresses are usually assigned in country-based blocks and can often be used to identify the country from which a computer is connected to the Internet. A browser ID provides the website operator with a wealth of information about the user such as the software being used to browse or surf the Internet. Additionally, the browser ID includes information about the user computer operating system, its current version, its Internet browser and the language. Thus, the browser ID has valuable information for identifying a unique user. The browser ID may also have more detailed information such as the type of content the user can receive; for example, this lets the website operator know if the user can run applications in FLASH-animation, open a PDF-file, or access a Microsoft Excel document.

Commercial websites also transfer cookies to a user's computer during a transaction between them. A cookie refers to a piece of information sent from the web server to the user web browser which is saved on the resident browser software. Cookies might contain specific information such as login or registration information, online "shopping cart" information, user preferences, etc.

The present invention provides a system for obtaining from a user's computer the time zone in which it is located, obtaining a longitude of an ISP server through which the user's computer accesses the Internet, calculating the difference in time zones of the user's computer location and the time zone of the ISP server, and generating a signal reporting the difference in time zones.

Other features and advantages of the invention will be apparent from the following specification taken in conjunction with the following Figures.

BRIEF DESCRIPTION OF THE DRAWINGS

To understand the present invention, it will now be described by way of example, with reference to the accompanying Figures in which:

FIG. 1 is a diagrammatic view of a user in an Internet transaction with a commercial website;

FIG. 2 is a flowchart of a user log on procedure to a commercial website, an exchange of information among the user, his ISP and the commercial website; and calculating a delta time zone parameter between the user's location and the ISP server location; and FIG. 3 is a flowchart of a website used to calculate a delta time zone parameter between the user's location and the ISP server location.

DETAILED DESCRIPTION

While this invention is susceptible of embodiment in many different forms, there is shown in the drawings, and will be described herein in detail, specific embodiments thereof with the understanding that the present disclosure is to be considered as an exemplification of the principles of the invention and is not intended to limit the invention to the specific embodiments illustrated.

As shown in FIG. 1, an exemplary on-line, Internet transaction 10 occurs between a user 12 on a user's computer 14, in a first location, accesses the Internet 16 through an Internet Service Provider ("ISP") server 18 in a second location, to access a commercial website 20. The table below shows exemplary locations and their time zones established through an international convention. Time zone numbers from −12 to +12 are with respect to a prime meridian that extends through Greenwich, U.K. and serves as the reference point 0 or Greenwich Mean Time ("GMT"). The positive numbers are to the East of Greenwich increasing up to an International Date Line at ±12 and the negative numbers are to the West of Greenwich up to the International date line. As shown in the table, while on standard time, New York, N.Y. is in the Eastern time zone GMT−5, Los Angeles, Calif. is in the Pacific time zone GMT−8, and Tokyo, Japan is in time zone GMT+9.

In a preferred form of the invention, the delta time zone calculation will take into account Daylight Savings Time ("DST" or Summer Time). DST is the portion of the year in which the local time of a region is usually advanced by one hour from its official standard time. DST begins for most of the United States of America at 2 a.m. on the first Sunday of April and clocks are turned (spring) forward one hour. Time reverts to standard time at 2 a.m. on the last Sunday of October and clocks are turned (fall) back one hour. Each time zone switches to and from DST at a different time. DST for the United States of America and its territories is not observed in Hawaii, American Samoa, Guam, Puerto Rico, the Virgin Islands, most of the Eastern Time Zone portion of the State of Indiana, and the state of Arizona (except the Navajo Indian Reservation which does observe DST). Meanwhile, for all countries in the European Union except Iceland, Summer Time begins and ends at 1 a.m. Coordinated Universal Time, UTC, which will be used synonymously with GMT, which generally starts on the last Sunday in March, and ends the last Sunday in October. All time zones change at the same moment in the EU.

| LOCATION | TIME ZONE GMT (+/−) |
|---|---|
| Europe: England, Scotland, Ireland, et al. | 0 |
| Africa: Mali, Burkina Faso, Liberia, Togo, et al. | 0 |
| Europe: France, Belgium, Germany, Switzerland, Italy, Norway, Poland, et al. | +1 |
| Africa: Algeria, Niger, Nigeria, Chad, Cameron, Gabon, Angola, Namibia, et al. | +1 |
| Europe. Finland, Estonia, Lithuania, Ukraine, Romania, Bulgaria, Greece, Turkey, et al. | +2 |
| Africa: Libya, Egypt, Democratic Republic of the Congo, Zambia, South Africa, et al. | +2 |
| Europe: Russia, et al. | +3 |
| Africa: Saudi Arabia, Iraq, Somalia, Ethiopia, Kenya, Tanzania, Madagascar, et al. | +3 |

-continued

| LOCATION | TIME ZONE GMT (+/−) |
|---|---|
| Asia: Azerbaijan, Georgia, Armenia, et al. | +4 |
| Africa: United Arab Emirates, Oman, Mauritius, et al. | +4 |
| Asia: Turkmenistan, Tajikistan, Pakistan, Uzbekistan, et al. | +5 |
| Asia: Kazakhstan, Kyrgyzstan, Bangladesh, et al. | +6 |
| Asia: Thailand, Indonesia, Cambodia, Laos, et al. | +7 |
| Asia: Brunei, Mongolia, China, Hong Kong, Malaysia | +8 |
| Singapore | +8 |
| Taiwan | +8 |
| Perth, Australia | +8 |
| Korea (North), Korea (South), Japan | +9 |
| Guam | +10 |
| Papua New Guinea | +10 |
| Northern Mariana Islands | +10 |
| Australia: Sydney, Brisbane, et al. | +10 |
| New Zealand | ±12 |
| USA: Samoa | −11 |
| USA: Hawaii | −10 |
| French Polynesia | −9 |
| USA: Alaska, Anchorage | −9 |
| USA: Pacific Time Zone: California, Oregon, Washington, et al. | −8 |
| Canada: Pacific: British Columbia, Yukon | −8 |
| USA: Mountain Time Zone: Colorado, Arizona, New Mexico, Montana, Idaho, et al. | −7 |
| Canada: Mountain: Alberta, Saskatchewan, Northwest Territories, et al. | −7 |
| USA: Central Time Zone Minnesota, Wisconsin, Missouri, Arkansas, Illinois, Indiana, Kentucky, Tennessee, Oklahoma, Texas, et al. | −6 |
| Canada: Central: Manitoba, Hunayut | −6 |
| USA: Eastern: Ohio, Georgia, Florida, Maine, Pennsylvania, Vermont, New Hampshire, New York, North Carolina, South Carolina, Delaware, Maryland, Rhode Island, et al. | −5 |
| Canada: Eastern: Ontario, Quebec, et al. | −5 |
| South America: Colombia, Ecuador, Chili, Peru, et al. | −5 |
| Canada: Atlantic: New Brunswick, Labrador, Nova Scotia | −4 |
| South America: Brazil (western), Bolivia, Paraguay, Venezuela, et al. | −4 |
| South America: Brazil (eastern), Uruguay, Argentina, et al. | −3 |
| Greenland | −3 |
| Cape Verde, Portugal | −1 |

In an exemplary Internet transaction 30 (FIG. 2), the user 12 will access the Internet 16 through the ISP server 18 in step 32 and using browser software navigate to the URL 34 of the commercial website 20 to initiate a transaction. The transaction can be for any purpose including, but not limited to, the purchase of goods or services, to interact with a financial institution or for other purposes well known to those skilled in the art. Upon making such an online connection, various items of information are transmitted 36 among the user's computer 14, the ISP server 18 and the commercial website 20, including metadata, personal information specific to the user, non-personal information corresponding to the user's computer, and the local time and time zone on the user's computer clock. Personal information includes, for example, the user's name, address, billing and shipping information, phone number, and/or e-mail addresses. Non-personal user information includes Common Gateway Interface ("CGI") parameters such as the user's computer IP address and a computer browser ID.

In a preferred form of the invention, the time zone of the user's computer clock or its resident clock, or local time, may be captured by the commercial website by issuing a gettime/getdate script resident on its server 38, typically through a program such as Javascript. For example the commercial website will transfer the following script "fp_timezone=". The user's computer will return a value, for example, "fp_timezone=1".

To obtain the location of the ISP server, the commercial website will employ geolocation algorithms or subscribe to a third party source capable of providing geolocation information for virtually all of the IP addresses in use such as AKAMI EDGESCAPE, MAXMIND® or other geolocation service providers. In one preferred form of the invention, the geolocation information will include the longitude of the geographic center of the county where the ISP server is located. Using the user's computer time zone and the ISP server time zone, the delta time zone can be calculated in terms of time zones or degrees of longitude. An example of computer code located on the commercial website to obtain the geolocation information of the ISP server from a third-party source such as AKAMAI is as follows:
HTTP_x_
AKAMAI_EDGESCAPE=georegion=_____,country_code.us,region_code=_____,city=_____,
dma=_____,pmsa=_____,msa=_____,areacode=_____,county=_____,fips=_____,
lat=_____,long=_____,timezone=_____,
zip=_____,continent=_____,
throughput=_____,bw=_____,
asnum=_____,location_id=_____. And an example of what is returned from AKAMAI to the commercial website is as follows:
HTTP_x_AKAMAI_EDGESCAPE=georegion=246,country_code.us,region_code=CA,city=SUNNYVALE,
dma=807,pmsa=7400,msa=7362,areacode=408,
county=SANTACLARA,fips=06085,lat=37.4186,long=−122.0206,timezone=PsT,zip=94085-94089,continent=NA,
throughput=vhigh,bw=257,asnum=1668,location_id=0.

One preferred method 40 (FIG. 3) for calculating the delta time zone includes the step of receiving at the website the user's time zone 42, the ISP server location 44 and computer code for calculating the delta time zone 46. In one preferred form of the invention using the values from above, the user's time zone will be converted to degrees of longitude which will be subtracted from the degrees of longitude of the ISP server and the absolute value of the resultant will be converted back to a number of time zones. Since there are 24 time zones distributed about 360° of the Earth there are roughly an average of 15° of longitude per time zone. Now the difference in time zones can be calculated in terms of degrees of longitude by subtracting the degrees of longitude of the user's computer from the degrees of longitude of the ISP server or vice versa. In one preferred form of the invention, the absolute value of this delta time zone number is what is important. The resultant number is then divided by 15 to convert the degrees of longitude back to a time zone number. The mathematical formula is: Delta time zone=the absolute value of ((the degrees of longitude of the ISP server)−((time zone of user's computer)*(15 degrees)))/15 degrees. Let's say the user's computer is in time zone+1 is (15 degrees*1)=15 degrees and the ISP server is located at a longitude of −122.0206 the calculation would be: the absolute value of (−122.0206−15)=137.0206 and this resultant is divided by 15 degrees or 137.0206/15=9.1347 or a delta time zone of 9 time zones.

In another preferred form of the invention, the longitude of the ISP server is converted into a time zone and then the delta time zone is calculated by subtracting the time zone of the user's computer from the ISP server, or vice versa, and taking the absolute value as follows: Delta time zone=the absolute value of ((degrees of longitude of ISP server/15)–time zone of user's computer). Using the same numbers as the previous example: Delta time zone=the absolute value of ((–122.0206/15)–1)=9.1347 or nine time zones. Upon completion of the calculation, the website reports the delta time zone number 48 for use by the website or others.

EXAMPLES

The delta time zone number can be used for various purposes such as direct marketing to the user, or as a fraud detection parameter. Each attempt at a commercial transaction on a commercial website must be analyzed to determine whether it is potentially fraudulent so the transaction can be monitored, blocked or terminated before a monetary loss is incurred. The delta time zone number can be used together with other fraud factors or logon procedures to detect and prevent a fraudulent Internet transaction from occurring.

There are numerous techniques used by unscrupulous individuals to commit fraudulent Internet transactions. In some instances, a fraudster will have obtained, surreptitiously or otherwise, sufficient identifying information of a victim including credit card numbers and use this information to steal money from the victim through a fraudulent Internet transaction. In an effort to avoid detection and arrest for this criminal activity, it is common for Internet fraudsters to attempt to disguise their true geolocation. One methodology used is to logon to the Internet through an ISP server remote from their true location. It is believed that the majority of Internet users logon to ISP servers within their time zone so the delta time zone is most commonly zero. There are also a number of Internet users that live on the border of a time zone line and have a delta time zone difference of one time zone. However, it is unusual for there to be a two time zone difference between a user's computer and the ISP server computer for example, a user in Denver, Colo. logging on to an ISP server in New York, N.Y. It is far more likely that a computer user in Denver will access the Internet through a Denver area ISP server than one as remote as New York. Thus, delta time zone values of two or greater are potentially suspect and are subject to increased scrutiny.

The delta time zone can also be used to detect a deviation from a user's customary practice and may indicate a potentially fraudulent activity. To this end, the commercial website server 20 will record all transactions including some of the following data such as metadata of the user, ISP, CGI, IP address, login name, password, credit card information of the user and delta time zone for that user. If a user typically uses a local ISP, the delta time zone is likely to be 0 or 1. If a user attempts to initiate a transaction with the commercial website 20 with a different delta time zone, then this deviation from a user's customary practice may be an indication of potentially fraudulent activity. Thus, the commercial website 20 will subject the user to increased scrutiny by requiring the user to enter additional authenticating information or take other steps to confirm the identity of the user is who it is reported to be before the transaction is allowed to proceed.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

I claim:

1. A computer-readable medium residing on a website server containing program instructions to determine a difference in a time zone of a user's computer accessing the Internet through an Internet Service Provider ("ISP") server and the time zone of the ISP server comprising:
    computer code on the website server that captures from a clock of the user's computer the user's time zone;
    computer code on the website server to obtain a location of the ISP server and determine a time zone of the ISP server using the location of the ISP server;
    computer code on the website server for calculating a difference in the time zone of the user's computer and the time zone of the ISP server to determine a delta time zone number; and
    computer code on the website server to report the delta time zone number for determining potential fraudulent activity.

2. The computer-readable medium of claim 1 wherein the computer code that captures from a clock of the user's computer the user's time zone comprises a getdate/gettime code.

3. The computer-readable medium of claim 2 wherein the getdate/gettime code is part of a login script.

4. The computer-readable medium of claim 1 wherein the computer code for obtaining the location of the ISP server comprises obtaining a degrees of longitude of the ISP server.

5. The computer-readable medium of claim 4 wherein the computer code for calculating the difference in the time zone of the user's computer and a time zone of the ISP server comprises the formula: Delta time zone=the absolute value of ((the degrees of longitude of the ISP server)–((time zone of user's computer)*(15 degrees)))/15 degrees.

6. The computer-readable medium of claim 1 further comprising computer code on the website server for converting the tithe zone of the user's computer into degrees of longitude.

7. The computer-readable medium of claim 6 wherein the computer code for converting the time zone of the user's computer into degrees of longitude comprises the formula: Degrees of longitude of user's computer=time zone number*15 degrees.

8. An apparatus to calculate a difference in a time zone of a user's computer accessing the Internet through an Internet Service Provider ("ISP") server and the time zone of the ISP server comprising:
    a website server with a processor coupled to a computer-readable medium storing a plurality of instructions, when executed by the processor, take the following steps:
    obtain a time zone from the clock of the user's computer;
    determine a location of the ISP server;
    determine a time zone of the ISP server using the location of the ISP server;
    calculate a difference in the time zone of the user's computer and the time zone of the ISP server to determine a delta time zone number; and
    report the delta time zone number for determining potential fraudulent activity.

9. The apparatus of claim 8 wherein the step of obtaining a time zone from the clock of the user's computer comprises a getdate/gettime code.

10. The apparatus of claim 9 wherein the getdate/gettime code is part of a login script.

11. The apparatus of claim 8 wherein the step of determining the location of the ISP server comprises computer code for capturing a degrees of longitude of the ISP server.

12. The apparatus of claim 11 wherein the step of calculating the difference in the time zone of the user's computer and a time zone of the ISP server comprises the formula: Delta time zone=the absolute value of ((the degrees of longitude of the ISP server)−((time zone of user's computer) *(15 degrees)))/15 degrees.

13. The apparatus of claim 8 further comprising instructions for converting the time zone of the user's computer into degrees of longitude.

14. The apparatus of claim 13 wherein the computer code for convening the time zone of the user's computer into degrees of longitude comprises the formula: Degrees of longitude of user's computer=time zone number*15 degrees.

* * * * *